United States Patent [19]

Lee

[11] Patent Number: 5,066,855

[45] Date of Patent: Nov. 19, 1991

[54] INFRARED INTRUSION DETECTOR

[75] Inventor: Wade Lee, Alamo, Calif.

[73] Assignee: Intelectron, Hayward, Calif.

[21] Appl. No.: 469,630

[22] Filed: Jan. 24, 1990

[51] Int. Cl.[5] .................... G01V 9/04

[52] U.S. Cl. .................... 250/221; 250/342

[58] Field of Search .................... 250/221, 342, 353; 340/567

[56] References Cited

U.S. PATENT DOCUMENTS

| | | | |
|---|---|---|---|
| 4,644,147 | 2/1987 | Zublin | 250/221 |
| 4,644,164 | 2/1987 | Mudge | 250/342 |
| 4,752,769 | 6/1988 | Knaup et al. | 340/567 |
| 4,841,284 | 6/1989 | Biersdorf | 250/342 |

*Primary Examiner*—David C. Nelms

*Attorney, Agent, or Firm*—Townsend and Townsend

[57] ABSTRACT

An improved infrared intrusion detector is provided which conveniently and expeditiously monitors two fields of view by use of a single sensor. In a preferred embodiment, the improved intrusion detector monitors fields of views which are substantially orthogonal in a nonobvious manner. It is nonobvious in that an aperture is provided in a housing which permits radiation from a second field of view to enter the housing. Internal optical elements are provided to direct this incident radiation from the second field of view onto a sensor used for the first field of view. The internal optical elements are protected from the environment and do not give advance warning that a second field of view is monitored. Generally, the second field of view is below the intrusion detector to detect unauthorized activity in a dead zone below the detector.

11 Claims, 4 Drawing Sheets

INFRARED INTRUSION DETECTOR

BACKGROUND OF THE INVENTION

The present invention relates generally to an intrusion monitor and more specifically to an improved intrusion monitor utilizing an infrared radiation detector capable of monitoring several physical areas at once in a simple and efficient manner.

Intrusion monitors of the prior art have a number of difficulties. Intrusion monitors are typically mounted on high on a wall and face a volume to be monitored. The monitors do not detect radiation from all volumes within a field of view, but only from a particular set of sub-volumes. This particular set is designed to permit the intrusion monitor to detect incident radiation from the selected sub-volumes which indicate an unauthorized entry into the protected volume. The set of sub-volumes does not typically include a dead zone sub-volume immediately under the monitor which extends from the wall to the first sub-volume which is monitored. Thus, a party desiring to gain entrance to a protected volume, could operate within the dead zone sub-volume without detection, effectively negating the intrusion monitor's purpose.

A prior art solution is to mount a mirror assembly external to a lens array which focuses incident radiation received from the monitored sub-volumes. The external mirror assembly is disposed to reflect radiation from dead zone sub-volumes into the lens array. Thus, radiation from the dead zone sub-volume is rerouted to enter the monitor where it may be detected. This solution has the disadvantage that its use alerts a would be unauthorized party to its intended purpose. That is, an external mirror assembly would tip off an unauthorized party that operation within previous dead zone sub-volumes would be detected.

The unauthorized party could then attempt an alternate method of entry or attempt to disable the external mirror assembly. As the external mirror assembly is accessible, disabling actions may be successful, and could be easily accomplished if there were periods of time in which the monitor was inoperative, such as during business hours. Additionally, external mirror assemblies would be affected by the environment and are generally more complex and thus expensive. Even such things as shipping and handling such a prior art monitor would be more expensive, as it is larger and bulkier, and more susceptible to accidental damage.

FIG. 1A is a graphical representation of a top view of a prior art intrusion detector 10. Detector 10 includes an infrared radiation sensor 12 protected from miscellaneous and extraneous infrared radiation by an envelope 14. Proximate to sensor 12 is a fresnel lens 16 to improve a range and sensitivity of sensor 12.

Fresnel lens 16 is a device well known in the art used to focus radiation onto sensor 12. The reader will understand the operation and uses of fresnel lenses, and no further description of their properties will be provided. Fresnel lens 16 is generally oriented to accept infrared radiation incident from a first field of view $F_1$.

First field of view $F_1$ may be narrow or relatively wide. Fresnel lens 16 has a defined relationship between it and sensor 12. A reference direction identified by datum line 20 defines a median direction from which incident radiation is effectively directed to sensor 12. A wide field of view refers to accepting radiation from within $\Theta$ degrees from datum line 20. Field of view $F_1$ is then twice $\Theta$ or approximately 115° in a plane including datum line 20 as depicted in FIG. 1A.

FIG. 1B is a perspective illustration of a side view of detector 10. Field of view $F_1$ includes radiation received within $\alpha$ degrees of datum line 20. Thus, first field of view $F_1$ is twice $\alpha$ or approximately 102° in a plane containing datum line 20 and normal to the plane including $\Theta$.

FIG. 2A is a perspective illustration of a side view of detector 10' incorporating a fresnel lens array 30 in lieu of fresnel lens 16. Fresnel lens array 30 is comprised of a plurality of fresnel lenses $\mathbf{16}_i$ each having a particular field of view $F_i$. The sum of the fields of view $F_i$ of each of fresnel lenses $\mathbf{16}_i$ make up a total field of view $F_T$ of lens array 30.

Each fresnel lens $\mathbf{16}_i$ of fresnel lens array 30 is oriented with its maximum sensitivity established in a different direction to improve total field of view $F_T$ for detectable radiation of fresnel lens array 30. It should be apparent that total field of view $F_T$ for fresnel lens array 30 in the vertical direction is greater than that of a fresnel lens 16. A typical fresnel lens array 30 has a total field of view $F_T$ range for $\Theta$ of approximately 110°.

FIGS. 2B and 2C are perspective illustrations of detector 10' during use as an infrared intrusion detector, with FIG. 2B illustrating a side view and FIG. 2C illustrating a top view. Detector 10' is typically mounted relatively high on a surface 40, e.g., a wall, and inclined approximately 10° to 14°. Detector 10' faces a volume V to be monitored. Fields of view $F_i$ of the individual fresnel lenses $\mathbf{16}_i$ define a pattern of discrete sub-volumes ($V_{11}-V_{mn}$) of volume V to be monitored. The pattern of these discrete sub-volumes $V_{ii}$ is designed to maximize protection of the entire volume V from intrusion.

However, because fresnel lens array 30 has a limited field of view, there are "blind spots," or dead zone sub-volumes Z, which cannot be monitored by detector 10'. This dead zone Z generally extends from wall 40 a significant distance. Dead zone Z extends approximately 10 feet for detector 10' mounted about 7 feet high and inclined about 12° from the horizontal. An intruder in this area would be able to advance or operate without detection by detector 10'.

U.S. Pat. No. 4,752,769, issued June 21, 1988 to Knaup et al., discloses a mirror assembly mounted exterior of a fresnel lens array to permit radiation outside a field of view of the lens array to be focused into the lens array.

SUMMARY OF THE INVENTION

The present invention provides an apparatus for adding a second field of view to an infrared intrusion detector. The addition is made simply and efficiently and without the use of external mirror assemblies which permit the improved device to nonobviously monitor sub-volumes previously unmonitored by prior art detectors. By improving performance of infrared intrusion detectors without the relatively bulky, expensive and complex expedient of applying external mirrors to increase the field of view of the detector, a better detector results. The detector becomes simpler, more manufacturable and transportable, and more secure from attempts to disable the device. Disabling of the improved detector is more difficult, providing greater reliability and security.

According to one aspect of the invention, it comprises a housing which surrounds a sensor and lens array oriented to receive infrared radiation from a first field of view generally in front of the sensor. In the housing, an aperture is provided in an orientation roughly orthogonal to the first field of view and directed to previously undetectable dead zones. The aperture permits radiation from a particular dead zone to enter the housing from a second field of view. An optical element is provided interior of the housing to direct radiation incident from this second field of view directly to the sensor. In this configuration, radiation from previously undetectable dead zones may now be detected.

A further understanding of the nature and advantages of the invention may be realized by reference to the remaining portions of the specification and the attached drawings.

BRIEF DESCRIPTION OF THE DRAWINGS

FIG. 4A is a perspective illustration of a detail side view of mirror assembly 70. FIGS. 4B, 4C, and 4D are, respectively, perspective illustrations of a top view, a front view, and a bottom view of mirror assembly 70 with FIG. 4D illustrating a plurality of facets required for optimal triggering.

DESCRIPTION OF THE PREFERRED EMBODIMENT

Figure 1A:
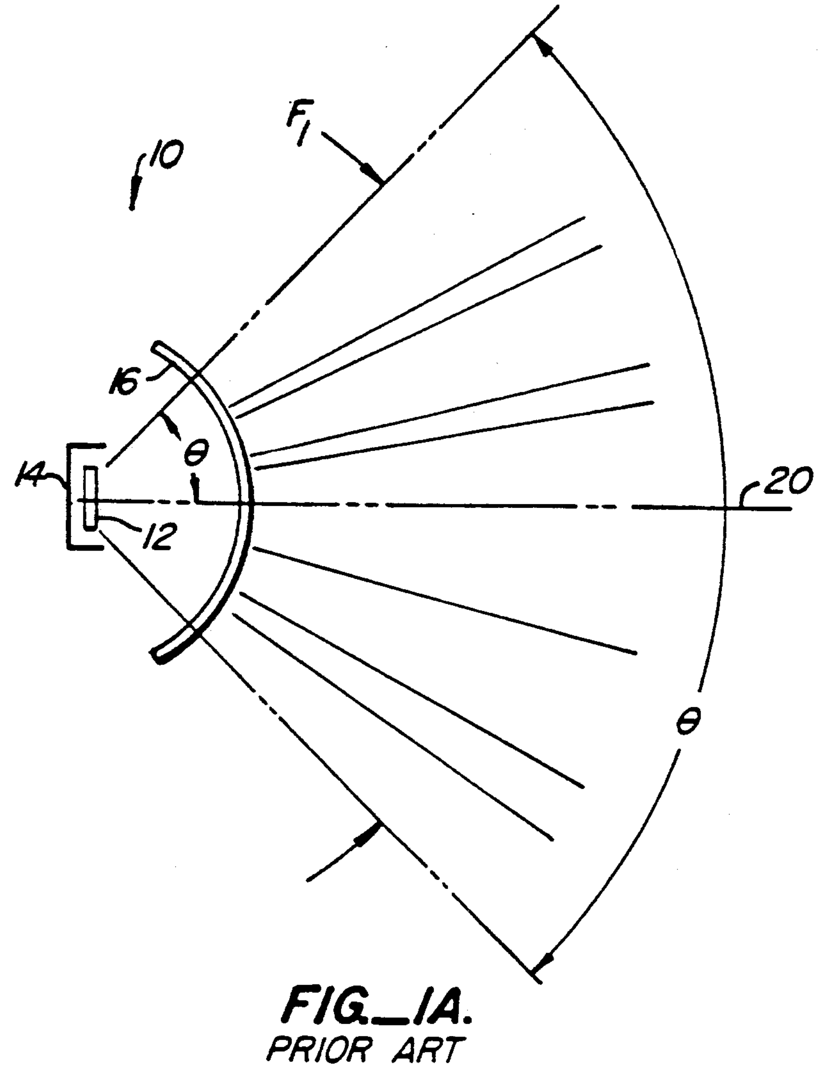
FIG 1A. PRIOR ART
FIG. 1A is a graphical representation of a top view of a prior art intrusion detector 10.
Figure 1B:
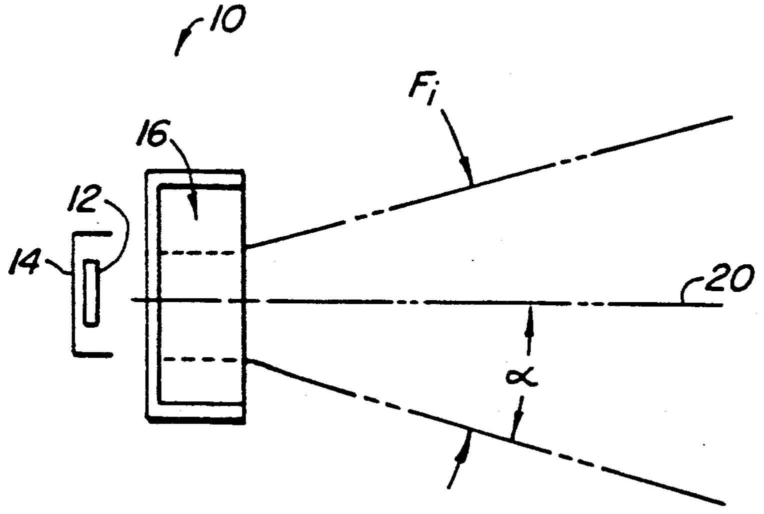
FIG 1B. PRIOR ART
FIG. 1B is a perspective illustration of a side view of detector 10.
Figure 2A:
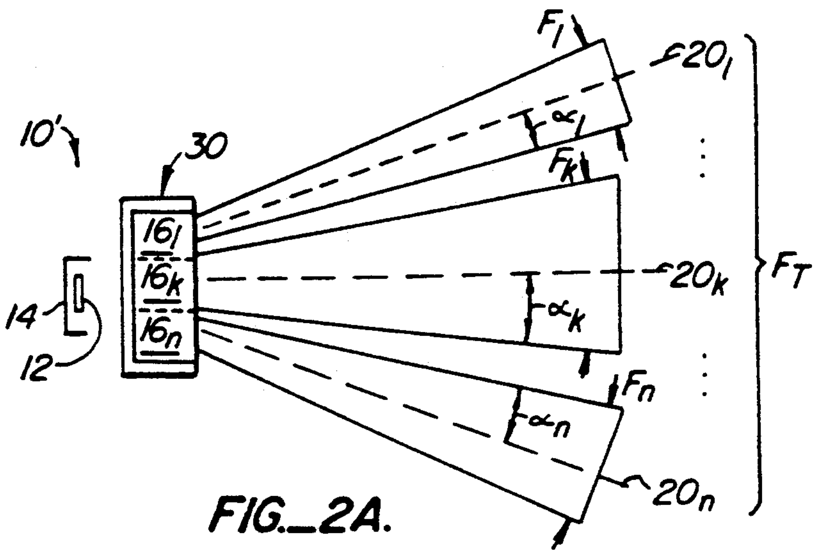
FIG. 2A is a perspective illustration of a side view of detector 10' incorporating a fresnel lens array 30 in lieu of fresnel lens 16.
Figure 2C:
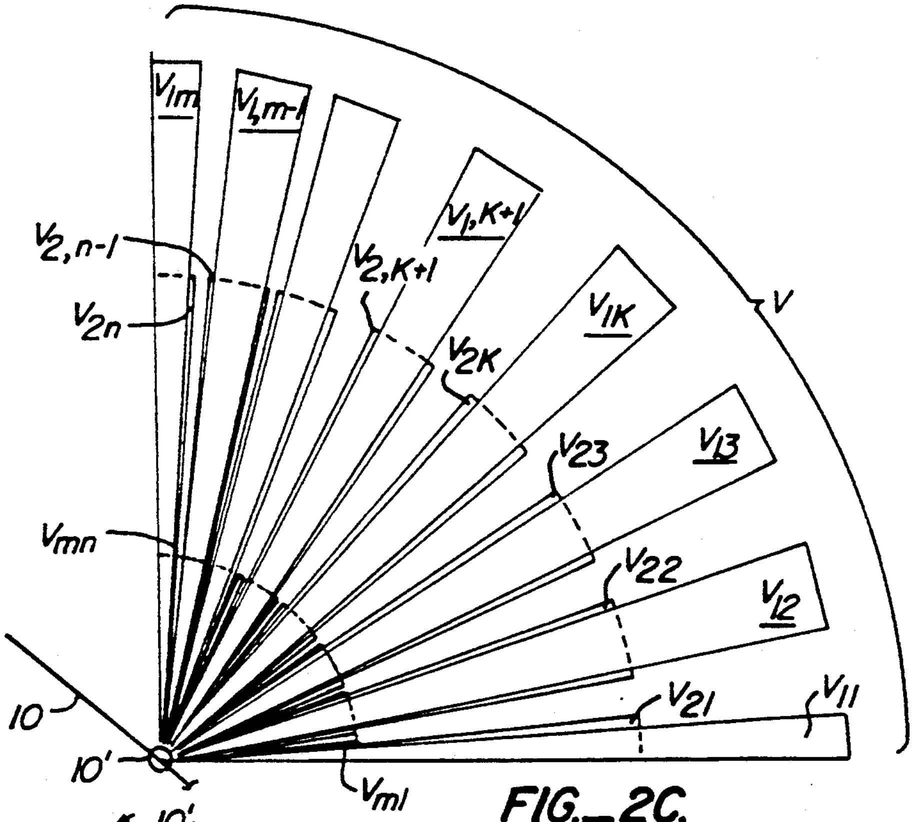
FIG. 2B and 2C are perspective illustrations of detector 10' during use as an infrared intrusion detector, with FIG. 2B illustrating a side view and FIG. 2C illustrating a top view.
Figure 2B:
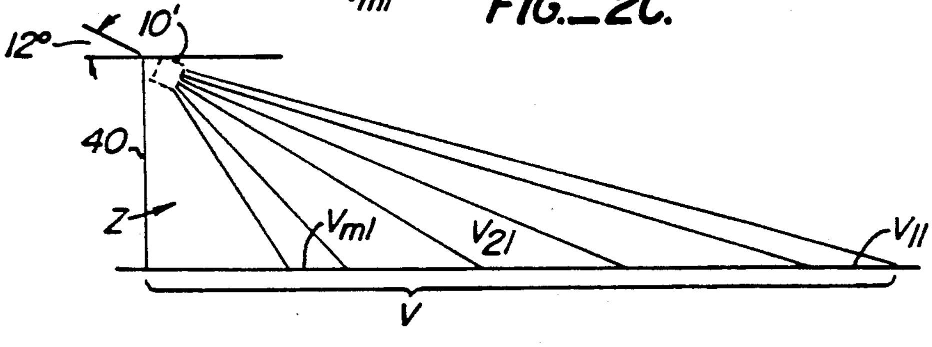
Figure 3:
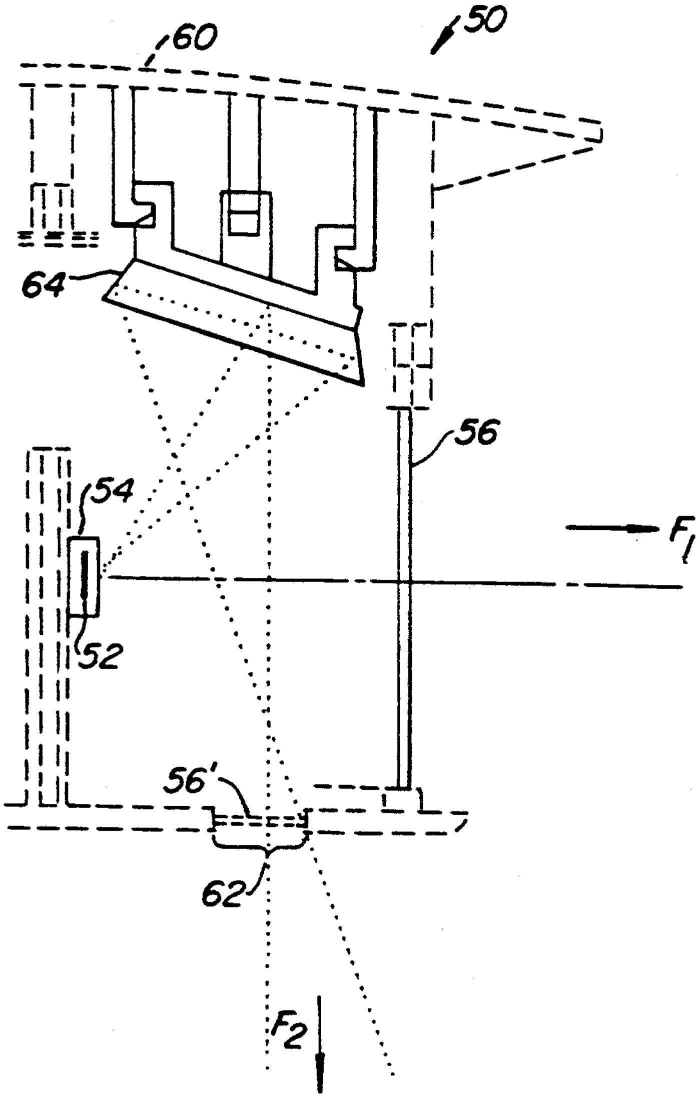
FIG. 3 is a perspective illustration of an infrared intrusion detector 50 according to a preferred embodiment of the present invention.

FIG. 3 is a perspective illustration of an infrared intrusion detector 50 according to a preferred embodiment of the present invention. Intrusion detector 50 has a sensor 52, a sensor envelope 54, and a fresnel lens array 56. Sensor 52 and envelope 54 are contained in a housing 60. Housing 60 incorporates lens array 56 proximate to sensor 52 in a first field of view $F_{T1}$ to concentrate incident radiation received from a first field of view $F_{T1}$ onto sensor 52. Incident radiation upon sensor 52 may be detected by any of the well-established methods well known in the art and will not be further described herein. It is to be noted that radiation incident upon sensor 52 exceeding a threshold level will trigger a signal indicating that a source of thermal energy has entered field of view $F_{T1}$.

An aperture 62 is provided in a portion of housing 60 to permit radiation incident from a previously unmonitored volume to enter housing 60. Generally, aperture 62 is disposed in housing 60 to permit radiation from a second field of view $F_2$ which is substantially orthogonal to first field of view $F_{T1}$.

Incident radiation received from second field of view $F_2$ strikes an optical element 64. Optical element 64 may be a reflective element or other structure which directs incident radiation from second field of view $F_2$ directly onto sensor 52. In the preferred embodiment, optical element 64 is a mirror assembly 70 illustrated in FIGS. 4A–4D, but other methods of directing incident radiation to sensor 52 from second field of view $F_2$ may be substituted. The radiation from second field of view $F_2$ may be detected without use of a fresnel lens 16 (not shown), or a fresnel lens array 30 (not shown), interposed before or after optical element 64.

Figure 4A:
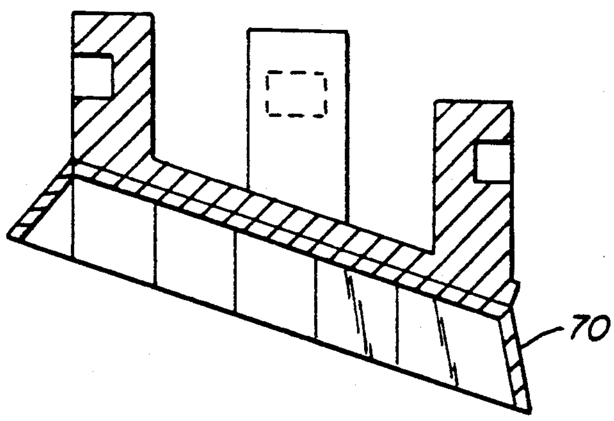
FIGS. 4A–4D are perspective illustrations of a preferred embodiment for mirror assembly 70.
Figure 4B:
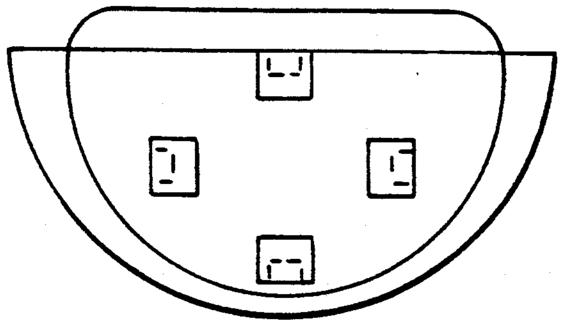
Figure 4C:
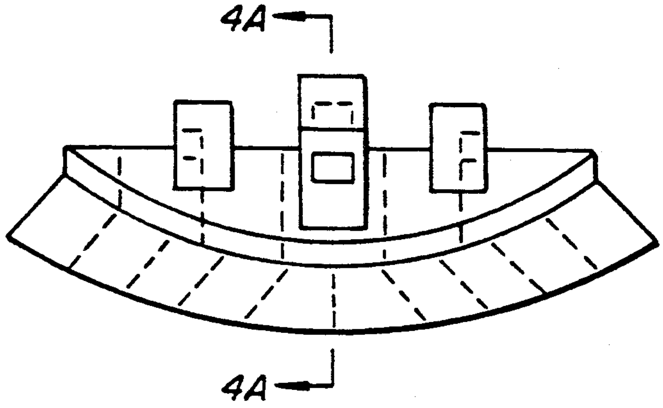
Figure 4D:
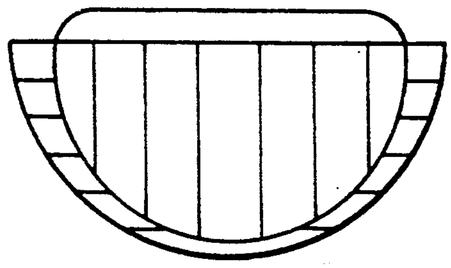

FIGS. 4A–4D are perspective illustrations of a preferred embodiment for mirror assembly 70. FIG. 4A is a perspective illustration of a detail side view of mirror assembly 70. FIGS. 4B, 4C, and 4D are, respectively, perspective illustrations of a top view, a front view, and a bottom view of mirror assembly 70. FIG. 4D illustrates a plurality of facets required for optimal triggering.

By reference to the foregoing, the reader will appreciate the simplicity of the present invention which improves over the state of the present art. By providing an aperture in a housing disposed to permit incident radiation from a previously unmonitored volume, and including an optical element which directs incident radiation onto a sensor, improved performance of an infrared intrusion detector results. The improved detector is less bulky and simpler than those in the prior art. The improved detector is also less susceptible to disabling acts directed to the detector because key elements are contained within the housing, and thereby shielded from vandalism and the environment. The improved infrared intrusion detector achieves the end result of monitoring dead zone sub-volumes in a non-obvious manner.

Various changes and alterations to the disclosed embodiment will be apparent to the reader given the benefit of the present disclosure. One such change would be the addition of an additional optional fresnel lens or lens array 56' (shown in phantom) in aperture 62 to improve the performance of the intrusion detection. Therefore, the reader is directed to the appended claims, rather than the foregoing description of a preferred embodiment, for determining the scope of the present invention.

What is claimed is:

1. In an infrared intrusion detection device having a first field of view including a first optical path having a fresnel lens array disposed in front of an infrared radiation sensor to direct incident radiation directly onto the sensor, the improvement comprising:

a housing encompassing a portion of the first optical path, said portion including the lens array and the sensor;

said housing having a first and a second aperture, with said first aperture disposed to provide the first field of view and the second aperture disposed to provide a second field of view at least about ninety degrees to the first field of view, said aperture permitting incident infrared radiation received from said second field of view to enter said housing along a second optical path; and an optical element disposed in said housing along said second optical path, said optical element directing said incident infrared radiation received from said second field of view to said sensor.

2. An infrared intrusion detector of the type having a first fresnel lens array directing incident infrared radiation along a first optical path from a first field of view to an infrared radiation sensor, comprising:

a housing incorporating the first fresnel lens array and the infrared radiation sensor, said housing having a first and a second aperture with said first aperture disposed to provide the first field of view and the second aperture disposed to permit incident infrared radiation from a second optical path to enter said housing, said second optical path included in a second field of view at least about ninety degrees to the first field of view; and an optical element, disposed within said housing and along said second optical path, oriented to direct said incident infrared radiation received through said aperture from said second field of view to said infrared radiation sensor.

3. The infrared intrusion detector of claim 2 wherein said optical element directs said incident infrared radiation directly onto said infrared radiation sensor.

4. The infrared intrusion detector of claim 2 wherein said optical element comprises a reflective assembly.

5. The infrared intrusion detector of claim 2 and further comprising:

a second fresnel lens array disposed in said second field of view over said aperture.

6. A radiation detector, comprising:

a sensor having a detecting surface and a first field of view perpendicular to said detecting surface;

a housing with a first and a second aperture, said first aperture disposed to permit radiation substantially along said first field of view to directly illuminate said sensor; and an optical element disposed within said housing for receiving radiation through said second aperture from a second field of view and directing said received radiation from said second aperture to illuminate said sensor.

7. The radiation detector of claim 6 wherein said second field of view is disposed substantially ninety degrees relative to said first field of view.

8. The radiation detector of claim 6 wherein said second field of view is disposed at least ninety degrees relative to said first field of view.

9. The radiation detector of claim 6 wherein said second field of view is disposed greater than ninety degrees relative to said first field of view.

10. A radiation detector, comprising:

a sensor having a detecting surface and a first field of view perpendicular to said detecting surface;

a housing having an aperture disposed for permitting radiation substantially along said first field of view to directly illuminate said sensor; and an optical element disposed within said housing for receiving radiation from a second field of view at least about ninety degrees relative to said first field of view and directing said received radiation from said second field of view to illuminate said sensor.

11. The radiation detector of claim 10 wherein said second field of view is disposed greater than ninety degrees relative to said first field of view.

* * * * *